(12) United States Patent
Stalling et al.

(10) Patent No.: US 7,609,884 B1
(45) Date of Patent: Oct. 27, 2009

(54) MUTUAL INFORMATION BASED REGISTRATION OF 3D-IMAGE VOLUMES ON GPU USING NOVEL ACCELERATED METHODS OF HISTOGRAM COMPUTATION

(75) Inventors: Detlev Stalling, Berlin (DE); Malte Westerhoff, Berlin (DE)

(73) Assignee: PME IP Australia Pty Ltd, Victoria (AU)

( * ) Notice: Subject to any disclaimer, the term of this patent is extended or adjusted under 35 U.S.C. 154(b) by 655 days.

(21) Appl. No.: 11/312,837

(22) Filed: Dec. 20, 2005

Related U.S. Application Data (60) Provisional application No. 60/639,446, filed on Dec. 23, 2004, provisional application No. 60/641,686, filed on Jan. 6, 2005.

(51) Int. Cl.
*G06K 9/00* (2006.01)
*G06K 9/32* (2006.01)
*G06K 9/34* (2006.01)

(52) U.S. Cl. .................. 382/168; 382/171; 382/294

(58) Field of Classification Search .................. 382/131, 382/168, 170, 171, 294; 345/629
See application file for complete search history.

(56) References Cited

U.S. PATENT DOCUMENTS

| | | | |
|---|---|---|---|
| 4,746,795 A | 5/1988 | Stewart et al. | |
| 4,984,160 A | 1/1991 | Saint Felix et al. | |
| 5,128,864 A | 7/1992 | Waggener et al. | |
| 5,218,534 A | 6/1993 | Trousset et al. | |
| 5,241,471 A | 8/1993 | Trousset et al. | |
| 5,253,171 A | 10/1993 | Hsiao et al. | |
| 5,287,274 A | 2/1994 | Saint Felix et al. | |
| 5,307,264 A | 4/1994 | Waggener et al. | |

(Continued)

FOREIGN PATENT DOCUMENTS

DE  103 17 384 A1  4/2004

(Continued)

OTHER PUBLICATIONS

Hastreiter et al. ("Integrated registration and visualization of medical image data", Proc. Computer Graphics International, Jun. 22-26, 1998, pp. 78-85).*

(Continued)

*Primary Examiner*—Yubin Hung
(74) *Attorney, Agent, or Firm*—Vierra Magen Marcus & DeNiro LLP

(57) ABSTRACT

The invention provides, in some aspects, methods and apparatus for registering 3D image volumes by utilizing a graphics processing unit (GPU) to facilitate maximizing the "mutual information" of the two image volumes being registered. Particularly, the GPU is used to compute a histogram representing a probability that a pixel value in one of the images being registered coincides with a pixel value in a transform of the other image. In one aspect, this histogram is generated by a two-step approach including (i) "drawing" a polygon covering a two-component render target having as many pixels as there are samples, where the value of each pixel in the target includes the intensities of the respective pixels of the first and second images, (ii) interpreting that render target as a buffer of vertex positions and, for each sample, rendering into a new render target, a single vertex using coordinates from that buffer.

16 Claims, 2 Drawing Sheets

U.S. PATENT DOCUMENTS

| | | |
|---|---|---|
| 5,375,156 A | 12/1994 | Kuo-Petravic et al. |
| 5,412,703 A | 5/1995 | Goodenough et al. |
| 5,412,764 A | 5/1995 | Tanaka |
| 5,442,672 A | 8/1995 | Bjorkholm et al. |
| 5,602,892 A | 2/1997 | Llacer |
| 5,633,951 A | 5/1997 | Moshfeghi |
| 5,671,265 A | 9/1997 | Andress |
| 5,813,988 A | 9/1998 | Alfano et al. |
| 5,821,541 A | 10/1998 | Tumer |
| 5,825,842 A | 10/1998 | Taguchi |
| 5,909,476 A | 6/1999 | Cheng et al. |
| 5,930,384 A | 7/1999 | Guillemaud et al. |
| 5,931,789 A | 8/1999 | Alfano et al. |
| 5,960,056 A | 9/1999 | Lai |
| 5,963,612 A | 10/1999 | Navab |
| 5,963,613 A | 10/1999 | Navab |
| 5,963,658 A | 10/1999 | Klibanov et al. |
| 6,002,739 A | 12/1999 | Heumann |
| 6,018,562 A | 1/2000 | Willson |
| 6,032,264 A * | 2/2000 | Beffa et al. ............ 714/7 |
| 6,044,132 A | 3/2000 | Navab |
| 6,049,582 A | 4/2000 | Navab |
| 6,088,423 A | 7/2000 | Krug et al. |
| 6,108,007 A | 8/2000 | Shochet |
| 6,108,576 A | 8/2000 | Alfano et al. |
| 6,264,610 B1 | 7/2001 | Zhu |
| 6,268,846 B1 | 7/2001 | Georgiev |
| 6,282,256 B1 | 8/2001 | Grass et al. |
| 6,289,235 B1 | 9/2001 | Webber et al. |
| 6,304,771 B1 | 10/2001 | Youdh et al. |
| 6,320,928 B1 | 11/2001 | Vaillant et al. |
| 6,324,241 B1 | 11/2001 | Besson |
| 6,377,266 B1 | 4/2002 | Baldwin |
| 6,404,843 B1 | 6/2002 | Vaillant |
| 6,415,013 B1 | 7/2002 | Hsieh et al. |
| 6,470,067 B1 | 10/2002 | Harding |
| 6,475,150 B2 | 11/2002 | Haddad |
| 6,507,633 B1 | 1/2003 | Elbakri et al. |
| 6,510,241 B1 | 1/2003 | Vaillant et al. |
| 6,519,355 B2 | 2/2003 | Nelson |
| 6,615,063 B1 | 9/2003 | Ntziachristos et al. |
| 6,636,623 B2 | 10/2003 | Nelson et al. |
| 6,697,508 B2 | 2/2004 | Nelson |
| 6,707,878 B2 | 3/2004 | Claus et al. |
| 6,718,195 B2 | 4/2004 | Van Der Mark et al. |
| 6,731,283 B1 | 5/2004 | Navab |
| 6,741,730 B2 | 5/2004 | Rahn et al. |
| 6,744,253 B2 | 6/2004 | Stolarczyk |
| 6,744,845 B2 | 6/2004 | Harding |
| 6,745,070 B2 | 6/2004 | Wexler et al. |
| 6,747,654 B1 | 6/2004 | Laksono et al. |
| 6,754,299 B2 | 6/2004 | Patch |
| 6,765,981 B2 | 7/2004 | Heumann |
| 6,768,782 B1 | 7/2004 | Hsieh et al. |
| 6,770,893 B2 | 8/2004 | Nelson |
| 6,771,733 B2 | 8/2004 | Katsevich |
| 6,778,127 B2 | 8/2004 | Stolarczyk et al. |
| 2001/0026848 A1 | 10/2001 | Van Der Mark et al. |
| 2002/0099290 A1 | 7/2002 | Haddad |
| 2002/0123680 A1 | 9/2002 | Vaillant et al. |
| 2002/0138019 A1 | 9/2002 | Wexler et al. |
| 2002/0150202 A1 | 10/2002 | Harding et al. |
| 2002/0150285 A1 | 10/2002 | Nelson |
| 2002/0180747 A1 * | 12/2002 | Lavelle et al. ............ 345/581 |
| 2003/0031352 A1 | 2/2003 | Nelson et al. |
| 2003/0059110 A1 * | 3/2003 | Wilt ............ 382/168 |
| 2003/0065268 A1 | 4/2003 | Chen et al. |
| 2003/0103666 A1 | 6/2003 | Edic et al. |
| 2003/0123720 A1 | 7/2003 | Launay et al. |
| 2003/0194049 A1 | 10/2003 | Claus et al. |
| 2003/0220569 A1 | 11/2003 | Dione et al. |
| 2004/0010397 A1 | 1/2004 | Barbour et al. |
| 2004/0015062 A1 | 1/2004 | Ntziachristos et al. |
| 2004/0022348 A1 | 2/2004 | Heumann |
| 2004/0066891 A1 | 4/2004 | Freytag et al. |
| 2004/0102688 A1 | 5/2004 | Walker et al. |
| 2004/0125103 A1 | 7/2004 | Kaufman et al. |
| 2004/0147039 A1 | 7/2004 | Van Der Mark et al. |
| 2004/0162677 A1 | 8/2004 | Bednar et al. |
| 2005/0152590 A1 | 7/2005 | Thieret et al. |
| 2005/0270298 A1 | 12/2005 | Thieret |
| 2005/0271302 A1 * | 12/2005 | Khamene et al. ............ 382/294 |

FOREIGN PATENT DOCUMENTS

| | | |
|---|---|---|
| EP | 0 492 897 A3 | 7/1992 |
| EP | 0 502 187 B1 | 9/1992 |
| EP | 0 611 181 A1 | 8/1994 |
| EP | 0 476 070 B1 | 8/1996 |
| EP | 0 925 556 B1 | 6/1999 |
| EP | 0 953 943 A2 | 11/1999 |
| EP | 0 964 366 A1 | 12/1999 |
| EP | 1 087 340 A1 | 3/2001 |
| EP | 00953943 A1 | 7/2004 |
| WO | WO 90/16072 | 12/1990 |
| WO | WO 91/02320 | 2/1991 |
| WO | WO 92/05507 | 4/1992 |
| WO | WO 92/05507 A1 | 4/1992 |
| WO | WO 96/42022 | 12/1996 |
| WO | WO 98/10378 | 3/1998 |
| WO | WO 98/12667 | 3/1998 |
| WO | WO 98/33057 | 7/1998 |
| WO | WO 01/20546 | 3/2001 |
| WO | WO 01/34027 | 5/2001 |
| WO | WO 01/63561 | 8/2001 |
| WO | WO 01/63561 A1 | 8/2001 |
| WO | WO 01/74238 | 10/2001 |
| WO | WO 01/85022 | 11/2001 |
| WO | WO 02/41760 | 5/2002 |
| WO | WO 02/067201 | 8/2002 |
| WO | WO 02/082065 | 10/2002 |
| WO | WO 03/061454 | 7/2003 |
| WO | WO 03/088133 | 10/2003 |
| WO | WO 03/090171 | 10/2003 |
| WO | WO 03/098539 | 11/2003 |
| WO | WO 2004/019782 | 3/2004 |
| WO | WO 2004/020996 | 3/2004 |
| WO | WO 2004/020997 | 3/2004 |
| WO | WO 2004/034087 A2 | 4/2004 |
| WO | WO 2004/044848 A1 | 5/2004 |
| WO | WO 2004/066215 A1 | 8/2004 |
| WO | WO 2004/072906 A1 | 8/2004 |

OTHER PUBLICATIONS

Ramirez et al. ("Prototypes stability analysis in the design of a binning strategy for mutual information based medical image registration", IEEE Annual Meeting of the Fuzzy Information, Jun. 27-30, 2004, vol. 2, pp. 862-866).*

Maes et al. ("Multimodality Image Registration by Maximization of Mutual Information," IEEE Tran. on Medical Imaging, vol. 16, No. 2, Apr. 1997. pp. 187-198).*

Sarrut et al. ("Fast 3D Image Transformations for Registration Procedures," Proc. Int'l Conf. on Image Analysis and Processing, Sep. 27-29, 1999, pp. 446-451).*

K. Mueller, and R. Yagel, "Rapid 3-D Cone Beam Reconstruction with the Simultaneous Algebraic Reconstruction Technique (SART) Using 2-D Texture Mapping Hardware", IEEE Transactions on Medical Imaging, Dec. 2000, 19(12): pp. 1227-1237.

Lange et al., "EM Reconstruction Algorithms For Emission And Transmission Tomography," J Computer Assisted Tomography 8, pp. 306, et seq. (1984).

Doggett, Michael, ATI, Programmability Features of Graphics Hardware, (paper) Apr. 23, 2002, pp. C1-C22.

B, T. Phong, "Illumination for Computer Generated Pictures," Communications of the ACM, 18(6), Jun. 1975, pp. 311-317.

Presentation entitled "Image Registration," 105 pp., Jan. 2004, Mercury Computer Systems, Inc.

Jones et al., "Positron Emission Tomographic Images And Expectation Maximization: A VLSI Architecture For Multiple Iterations Per Second", Computer Technology and Imaging, Inc., 1988 IEEE, pp. 620-624.

"Rib Cage Projection," downloaded from http://www.colorado.edu/physics/2000/tomography/final_rib_cage.html on Dec. 26, 2002, 3 pages.

Kajiya, J. T., "Ray Tracing Volume Densities," Proc. Siggraph, Jul. 1984, Computer Graphics, vol. 18, No. 3, pp. 165-174.

Roettger, Stefan, et al., "Smart Hardware-Accelerated Volume Rendering," Joint Eurographics—IEEE TCVG Symposium on Visualization, 2003, pp. 231-238, 301.

H. Pfister, et. al., "The VolumePro real-time ray-casting System," Computer Graphics (Proceedings of Siggraph), Aug. 1999, pp. 251-260.

"Filtered Backprojection Reconstruction", http://www.physics.ubd.ca/~mirg/home/tutorial/fbp_recon.html, Feb. 6, 2003, 5 pages.

I. Viola, et al., "Hardware Based Nonlinear Filtering and Segmentation Using High Level Shading Languages," Technical Report TR-186-2-03-07, May 2003, 8 pages.

"Overview of X-Ray Computed Tomography," http://www.howstuffworks.com/framed.htm?parent=c...tm&url=http://www.ctlab.geo.utexas.edu/overview/, Dec. 26, 2002, 5 pages.

Hadwiger, Markus, et al., "Hardware-Accelerated High-Quality Reconstruction of Volumetric Data on PC Graphics Hardware," VRVis Research Center, Vienna, Austria, and Institute of Computer Graphics and Algorithms, Vienna University of Technology, Austria, 9 pages.

Printouts from Microsoft.com, from "http://msdn.microsoft.com/library/default.asp?url=/library/en-us/dx8_c/directx_cpp/Graphics/ProgrammersGuide/GettingStarted/Architecture," Dec. 20, 2002, 22 pages.

Hudson et al., "Accelerated Image Reconstruction Using Ordered Subsets of Projection Data", IEEE Transactions on Medical Imaging, vol. 13, No. 4, Dec. 1994, pp. 601-609.

Chidlow, et al, "Rapid Emission Tomography Reconstruction," Proceedings of the 2003 Eurographics/IEEE TVCG Workshop on Volume Graphics, Tokyo, Japan, Jul. 7-8, 2003, 13 pages.

Corner, B., University of Nebraska-Linolcn, MatLab.txt, 2003, 1 page.

J. Kruger, and R. Westermann, "Acceleration Techniques for GPU-based Volume Rendering," Proceedings of IEEE Visualization, 2003, 6 pages.

Cabral et al., "Accelerated Volume Rendering and Tomographic Reconstruction Using Texture Mapping Hardware", Silicon Graphics Computer Systems, 1995 IEEE, pp. 91-97.

Mitchell, Jason L., "RadeonTM 9700 Shading," Siggraph 2002—State of the Art in Hardware Shading Course Notes, pp. 3.1-1-3.1-39, 39 pages, (2002).

Dachille, et al. "High-Quality Volume Rendering Using Texture Mapping Hardware," Siggraph/Eurographics Hardware Workshop (1998) (8 pages).

Hakan Selldin, "Design and Implementation of an Application Programming Interface for Volume Rendering," Linkopings Universitet, (2002).

Lange et al., "Globally Convergent Algorithms for Maximum a Posteriori Transmission Tomography," IEEE Transactions on Image Processing, Vo. 4, No. 10, Oct. 1995, pp. 1430-1438.

N. Max, "Optical Models for Direct Volume Rendering," IEEE Transactions On Visualization and Computer Graphics, Jun. 1995, 1(2): pp. 99-108.

Viola, "Alignment by Maximization of Mutual Information," PhD Thesis MIT (Also Refered To As—"AI Technical report No. 1548"), MIT Artificial Intelligence Lab, Jun. 1, 1995, pp. 1-29.

Sandborg, Michael, "Computed Tomography: Physical principles and biohazards," Department of Radiation Physics, Faculty of Health Sciences, Linkoping University, Sweden, Report 81 ISSN 1102-1799, Sep. 1995 ISRN ULI-RAD-R—81—SE, 18 pages.

Michael J. McCool, "Smash: A Next-Generation API for Programmable Graphics Accelerators," Technical Report CS-200-14, Computer Graphics Lab Dept. of Computer Science, University of Waterloo, Aug. 1, 2000.

Cohen, Michael, et al., "A Progressive Refinement Approach to Fast Radiosity Image Generation," Computer Graphics, vol. 22, No. 4, Aug. 1988, pp. 75-84.

Doggett, Michael, ATI, Programmability Features of Graphics Hardware, (slideshow) slides 1-62, 31 pages, (2003).

Anuj Jain, "A Programmable Graphics Chip," pcquest.com, Jun. 18, 2001.

Li et al., "Tomographic Optical Breast Imaging Guided by Three-Dimensional Mammography," Applied Optics, Sep. 1, 2003, vol. 42, No. 25, pp. 5181-5190.

Purcell, T., et. al., "Ray tracings on Programmable Graphics Hardware," Computer Graphics (Proceedings of Siggraph), 1998, pp. 703-712.

"Technical Brief: NVIDIA nfiniteFX Engine: Programmable Vertex Shaders," NVIDIA Corporation, 12 pages, (2001).

"ATI Website Index," http://www.ati.com/developer/index.html, Dec. 20, 2002, 2 pages.

Dobbins et al., "Digital X-Ray Tomosynthesis: Current State of the Art and Clinical Potential," Physics in Medicine and Biology, vol. 48, pp. R65-R106 (2003).

"Technical Brief: NVIDIA nfiniteFX Engine: Programmable Pixel Shaders," NVIDIA Corporation, 5 pages, (2001).

Hopf, M., Ertl, T., "Accelerating 3D Convolution using Graphics Hardware," Proc. IEEE Visualization, 1999, 5 pages.

Dempster et al., "Maximum Likelihood From Incomplete Data Via The EM Algorithm", Harvard University and Educational Testing Service, Dec. 8, 1976, pp. 1-38.

Wu et al., "Tomographic Mammography Using A Limited Number of Low-dose Conebeam Projection Images," Med. Phys., pp. 365-380 (2003).

* cited by examiner

Figure 1

Figure 2

MUTUAL INFORMATION BASED REGISTRATION OF 3D-IMAGE VOLUMES ON GPU USING NOVEL ACCELERATED METHODS OF HISTOGRAM COMPUTATION

This application claims the benefit of filing of U.S. Provisional Patent Application Ser. No. 60/639,446, filed Dec. 23, 2004, entitled "Mutual Information Based Registration of 3d-image Volumes on GPU Using Novel Accelerated Methods of Histogram Computation," and U.S. Provisional Patent Application Ser. No. 60/641,686, filed Jan. 6, 2005, and also entitled "Mutual Information Based Registration of 3d-image Volumes on GPU Using Novel Accelerated Methods of Histogram Computation," the teachings of both of which are incorporated herein by reference.

BACKGROUND OF THE INVENTION

The invention relates to digital data processing and, particularly, to registering 3D image volumes. The invention has application, by way of non-limiting example, in medical imaging, e.g., in aligning diagnostic images acquired by computed tomography (CT) and/or magnetic resonance imaging (MRI). Other applications include microscopy and geosciences, to name but a few fields.

A common problem in three-dimensional (3D) imaging is, given two different 3D image volumes of the same object or of two different but corresponding objects, to compute a 3D transformation (e.g., rotation, translation, scaling) that brings the two images into alignment, so that after transformation, corresponding points in the two images are coincident or at least close to each other. This problem arises, for example, in aligning multiple 3D images (e.g., of a patient's head) generated by Computed Tomography (CT) and/or Magnetic Resonance Imaging (MRI).

A widely accepted standard procedure for solving this problem is to search in a space of transformations for the transformation that maximizes the "mutual information" of the two images. (See, by way of non-limiting example, Viola, "Alignment by Maximization of Mutual Information," PhD thesis, Massachusetts Institute of Technology (MIT), Cambridge, Mass., March 1995, also referred to as A.I. Technical Report No. 1548, dated June 1995, of the MIT Artificial Intelligence Laboratory, the teachings of which are incorporated herein by reference).

Thus, given two digital images A and B with range [0 ... N−1], i.e.

A: $\Re^3 \to [0 \ldots N-1]$, B: $\Re^3 \to [0 \ldots N-1]$ then for a given transformation T: $\Re^3 \to \Re^3$, the Mutual Information is defined by $$H(A, B \circ T) = -\sum_{a=0}^{N}\sum_{b=0}^{N} p_{A,B \circ T}(a, b)\log(p_{A,B \circ T}(a, b))$$

Here $P_{A,B \circ T}(a,b)$ denotes the probability that a pixel value a in image A coincides with a pixel value b in the transformed image B∘T. In order to compute this probability, essentially a 2D histogram has to be computed, namely:

$$p_{A,B \circ T}(a, b) = \mathrm{card}(\{x \in G \mid A(x) = a \wedge B(T(x)) = b\}) \frac{1}{\mathrm{card}\ G}$$

Here card denotes the number of elements in a set. The set G of locations x over which the histogram is computed may be chosen to consist of all pixels centres of the reference image A, or of any other possibly smaller set of points.

With this background, an object of this invention is to provide improved methods and apparatus for digital data processing.

A more particular object, by way of example, is to provide improved methods and apparatus for registering 3D image volumes.

Yet another more particular object, again, by way of example, is to provide improved such methods and apparatus as can be implemented at lower cost. And, a related aspect of the invention is to provide such methods and apparatus as can be implemented using standard, off-the-shelf components.

SUMMARY OF THE INVENTION

The foregoing are among the objects attained by the invention which provides, in some aspects, methods and apparatus for registering 3D image volumes by utilizing a graphics processing unit (GPU), to reduce computation time, e.g., in comparison to conventional implementations on a central processing unit (CPU).

Related aspects of the invention provide such methods and apparatus as utilize a GPU to facilitate maximizing the "mutual information" of the two images volumes being registered.

Yet still further related aspects of the invention provide such methods and apparatus as utilize the GPU to compute a histogram that facilitates determining a probability that a pixel value in one of the images being registered coincides with a pixel value in a transform of the other image.

Further aspects of the invention provide such methods and apparatus as utilize a two-pass approach to perform data scattering that supports histogram computation on the GPU. That approach includes the steps of, according to some aspects of the invention, (i) "drawing" a polygon covering a two-component render target having as many pixels as there are samples, (ii) interpreting that render target as a buffer of vertex positions and, for each sample, rendering into a new render target, a single vertex using coordinates from that buffer.

Related aspects of the invention provide such methods and apparatus in which the aforementioned two-step approach includes setting up the two-component render target with as many pixels as there are samples. The locations x of the samples can be stored in a texture residing on the GPU. This texture can have the same resolution as the render target. In addition, the images being aligned can be stored in (3D) textures also residing on the GPU.

A further related aspect of the invention provides such methods and apparatus in which the "drawing" step includes drawing a simple polygon covering the whole render target. For each pixel the location x of corresponding sample point is looked up. The intensities A(x) and B(T(x)) are then looked up and written into the render target.

A still further related aspect of the invention provides such methods and apparatus in which the interpreting step comprises (i) interpreting the two-component floating point render target as a buffer containing vertex positions, (ii) setting up the new render target to be of size N×N and initializing it to zeros, and (iii) for each sample, rendering a single vertex using the coordinates from the vertex buffer. Additive blending can be enabled and for each sample the corresponding output pixel is incremented by one According to related aspects of the invention, after all samples have been rendered, the N×N render target represents the aforementioned histogram. This can be read back, for example, into main memory, and mutual information computed (e.g., on the CPU) as described above.

Still further aspects of the invention provide methods and apparatus as described above in which data sets that are too large to fit entirely into texture memory are broken down into smaller "bricks," which are processed independently. According to related aspects of the invention, the resulting histograms are combined in a further step. According to still further related aspects of the invention, if more samples are taken than fit into a single texture, multiple passes are rendered, accumulating into the same histogram render target.

According to still other aspects of the invention, as an alternative to storing the sample locations in a texture, they are computed on-the-fly in the GPU's vertex or pixel shader.

Methods and apparatus according to the foregoing aspects of the invention can be used in connection with rigid or affine transformations, as well as for any other transformation(s) that can be evaluated on a GPU.

Methods and apparatus according to these aspects of the invention can parallel those described above except that, for example, in the drawing step, instead of rendering the intensities A(x) and B(T(x)) into a two-channel render target, the value A(x)*N+B(T(x)) is rendered into a single channel render target.

Methods and apparatus according to these aspects of the invention can further parallel those described above except that, by way of further example, in the interpreting step, a ID histogram is computed over the render target.

Methods and apparatus according to these aspects of the invention can still further parallel those described above except that, by way of still further example, the resultant ID histogram is interpreted as a 2D histogram using the following definition:

$$p_{A,B \circ T}(a, b) = p^{1D}_{A,B \circ T}(a * N + b)$$

These and other aspects of the invention are evident in the text that follows.

BRIEF DESCRIPTION OF THE ILLUSTRATED EMBODIMENT

A more complete understanding of the invention may be attained by reference to the drawings, in which.

DETAILED DESCRIPTION OF THE ILLUSTRATED EMBODIMENT

Described below are methods, apparatus and systems according to the invention that, inter alia, register three-dimensional (3D) image volumes by utilizing a graphics processing unit (GPU, also called "graphics card") to facilitate maximizing the "mutual information" of the two images volumes and, thereby, reducing computation time necessary for such registration.

Apparatus and System Architecture

Figure 1:
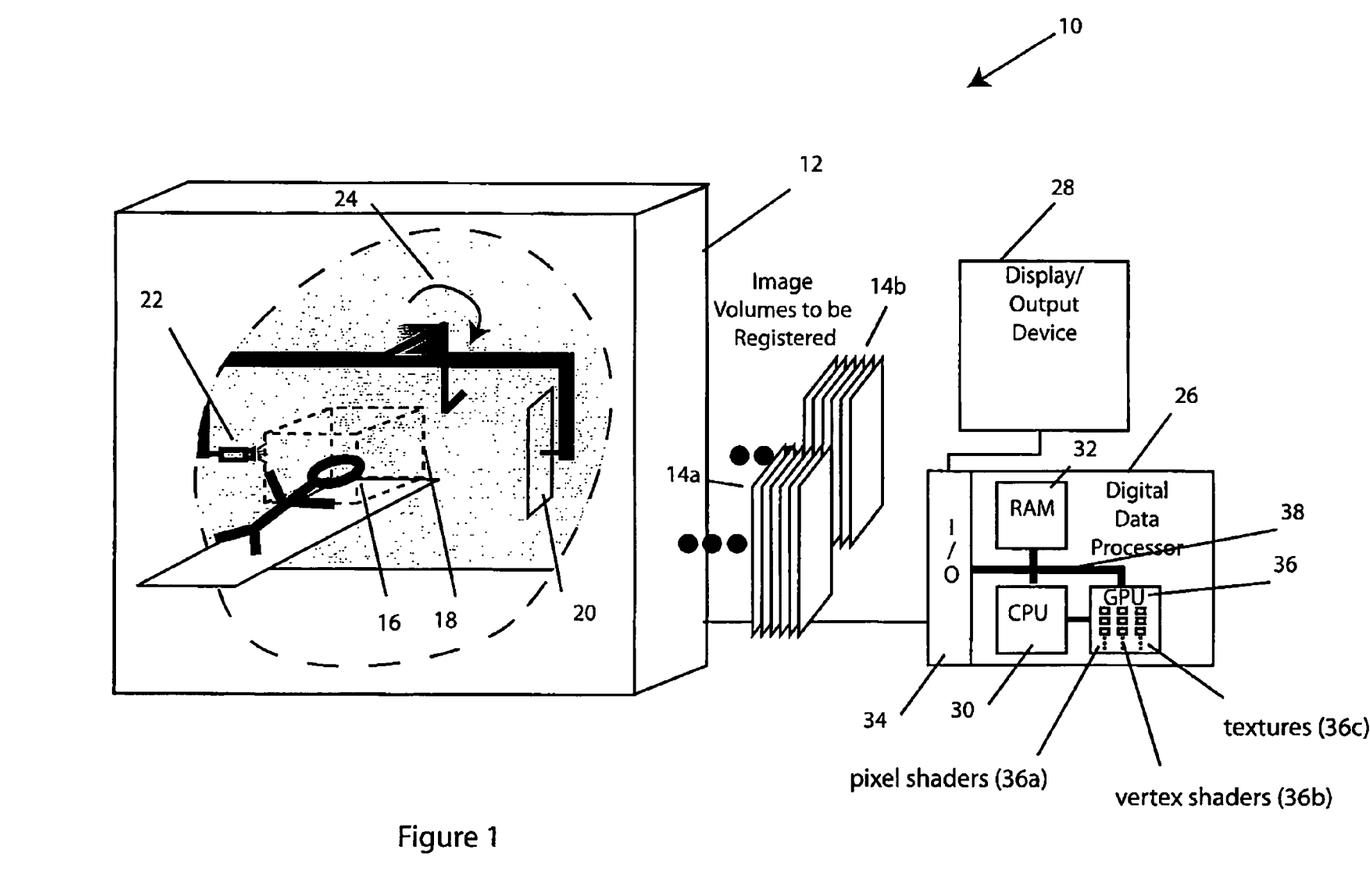
FIG. 1 depicts an environment in which methods according to the invention can be practiced, as well as apparatus and systems according thereto.

Such methods can be implemented in an imaging and digital processing environment of the type disclosed in commonly assigned U.S. Pat. No. 7,120,283, entitled Improved Methods and Apparatus for Back-Projection and Forward-Projection, the teachings of which are incorporated herein by reference. Referring to FIG. 1, that environment comprises a computer aided tomography system 10—although methods according to the invention can be implemented in other environments, as well.

The system 10 includes a conventional image acquisition apparatus 12 that generates projection images 14 of a volume 18 of an object 16. In the illustrated environment, this is accomplished in the conventional manner, e.g., by illuminating the object 16 with radiation from a source 22 and detecting with detector 20 (such as a charged-coupled device or other sensor array), radiation not absorbed by the object 16. Generally, multiple projection images are obtained, e.g., at different respective angles, in order that a three-dimensional representation of the object can be reconstructed, e.g., using the principles of computed tomography, computed tomosynthesis, and so forth.

Digital data processor 26 can be configured to perform that reconstruction (though such functionality is not critical to practice of the invention). In the illustrated embodiment, the digital data processor 26 forms part of a workstation that, additionally, registers pairs of such image volumes produced by such reconstruction. Alternatively, or in addition, digital data processor 26 can register, for example, an image volume produced by such reconstruction with an image volume generated by other medical imaging apparatus, e.g., other CT systems (not shown), magnetic resonance imaging systems (not shown), positron emission systems (not shown), to name a few. Still further, by way of example, digital data processor 26 can register pairs of image volumes generated by such other medical imaging apparatus.

More generally, although FIG. 1 shows a computer aided tomography system, it will be appreciated that digital data processor 26 and the techniques discussed herein are more broadly applicable to registering image volumes for a full range of medical and non-medical imaging applications and techniques, such as, by way of non-limiting example, geosciences, or microscopy, computer tomographs, magnetic resonance imaging devices, or confocal microscopes, to name just a few. Moreover, although digital data processor 26 is shown here has a stand-alone device, in other embodiments, it may be configured differently, e.g., as an embedded processor, or otherwise.

Regardless, it will be appreciated that methods as described herein, when implemented on such a digital data processor, form apparatus according to the invention. Further, when implemented on systems that include a digital data processor and other apparatus, e.g., image acquisition apparatus, such methods form systems according to the invention.

As shown in the drawing, the digital data processor 26 includes a central processing unit (CPU) 30, dynamic memory (RAM) 32, and I/O section 34, all of the type conventionally known the art. The digital data processor 26 may be coupled, via I/O section 34, with acquisition device 12, as well as with a monitor or other presentation device 28 on which the registered (and unregistered) images may be displayed. I/O section 34 can also provide coupling to other apparatus, e.g., other medical imaging systems, that generate image volumes requiring registration.

Illustrated digital data processor 26 also includes a graphical processing unit (GPU) 36 that is coupled to the CPU 30, through which it can access the other elements of the digital data processor 26, as shown. The GPU 36 includes pixel shaders 36a, vertex shaders 36b and textures 36c, all of the conventional type known in the art. The GPU serves, in the illustrated embodiment, as a coprocessor, operating with and under the control of the CPU 30 to facilitate registering three-dimensional (3D) image volumes in accord with the teachings hereof. Other embodiments of the invention employ multiple GPUs for this purpose, each responsible for a respective portion of processing described below. Still other embodiments use no GPU at all, relying on other types of processing elements (such as array processors, game engine processors, and so forth) to provide or supplement such processing, all in accord with the teachings hereof.

In embodiments which use GPUs, e.g., as described above, preferred such devices are of the variety having programmable vertex shaders and programmable pixel shaders and are commercially available in the marketplace from ATI Research (for example, the Radeon™ 9700 processor), Nvidia (for example, the GeForce™ FX and Quadro® processors) and/or otherwise compatible with vertex shader version 3.0, ARB_vertex_shader extension (for Approach 1 described below) and/or the ARB_IMAGING_EXTENSION (for Approach 2 described below).

Methods

Given two different 3D image volumes of the same object or of two different but corresponding objects, digital data processor 26 computes a 3D transformation (e.g. rotation, translation, scaling) that brings the two images into alignment, so that after transformation, corresponding points in the two images are coincident or at least close to each other. As noted above, those images may be from volume reconstructions performed by processor 26 itself and/or by other medical imaging apparatus. To this end, CPU 30 executes software that provides for such image volume alignment by searching a space of transformations for the transformation that maximizes the "mutual information" of the two images, for example, in accord with the general techniques disclosed by Viola, "Alignment by Maximization of Mutual Information," supra (the teachings of which are incorporated herein by reference), as modified in accord with the teachings hereof. Thus, that software executes in accord with a general methodology that may be described as follows.

Given two digital images A and B with range [0 . . . N−1], i.e.,

A: $\Re^3 \rightarrow [0 \ldots N-1]$, B: $\Re^3 \rightarrow [0 \ldots N-1]$ then for a given transformation T: $\Re^3 \rightarrow \Re^3$, the Mutual Information is defined by $$H(A, B \circ T) = -\sum_{a=0}^{N} \sum_{b=0}^{N} p_{A,B \circ T}(a, b) \log(p_{A,B \circ T}(a, b))$$

Here $p_{A,B \circ T}(a,b)$ denotes the probability that a pixel value a in image A coincides with a pixel value b in the transformed image B∘T.

In order to compute that probability, digital data processor 26 computes, with the aid of GPU 36, a 2D histogram that can be expressed as follows:

$$p_{A,B \circ T}(a, b) = \text{card}(\{x \in G \mid A(x) = a \wedge B(T(x)) = b\}) \frac{1}{\text{card } G}$$

In the foregoing expressions,

G denotes a set of locations within the images over which the probability and the histogram are to be computed. The set G may be chosen to consist of all pixels (and specifically, for example, all pixel centres) of the reference image A, or of any other possibly smaller set of points.

card denotes the number of elements in the set,

N is the maximum pixel intensity value in the images A, B being aligned (and, more precisely, among the locations within set G). More generally, N can represent any other maximum "binning" value for histogram generation. Thus, in the illustrated embodiment, N can be 256 where A and B are full-range gray scale images. However, to minimize processing resources and/or time, lower values of N can be used as well, and x denotes locations within the set.

In the illustrated embodiment, the aforementioned histogram is computed in accord with any of the approaches described below. These may be better understood by reference to the flowcharts of FIG. 2. In the discussion that follows, it will be appreciated that the trans-formation T (shown in the drawings as B∘T and in the text below as B(T(x)) is not limited to rigid or affine transformations, but could be any transformation that can be evaluated on a GPU. Moreover, it will be appreciated that, although the methods described below are applied to computation of a histogram for two images, one of which is transformed, those methods are equally applicable to computation of histograms for non-transformed images.

Approach 1

Figure 2:
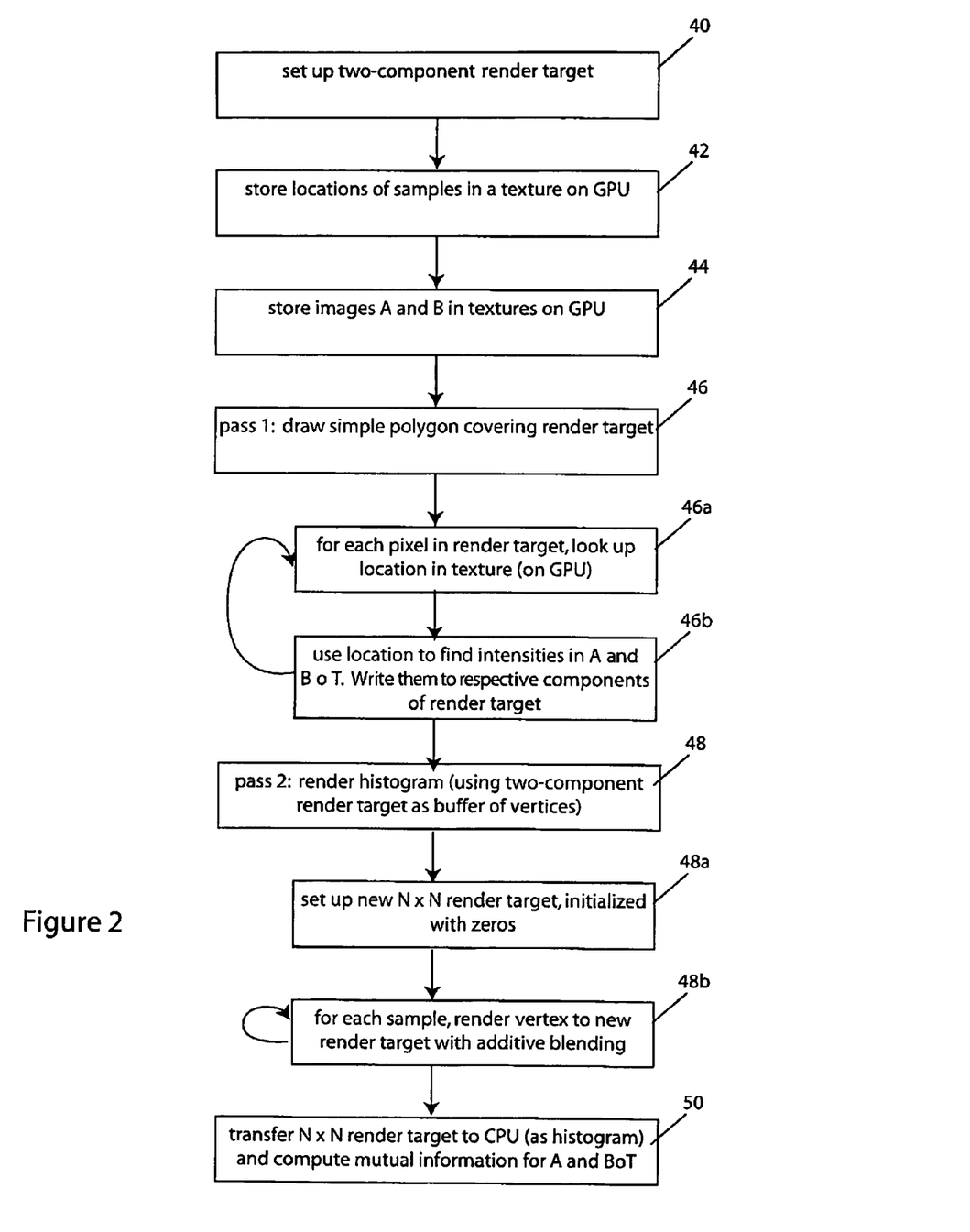
FIG. 2 is a flow chart depicting a method according to the invention for computing histograms used in determining the mutual information in two images.

In order to efficiently compute the histogram, digital data processor 26 makes use of the capabilities of GPU 36 (which can be of the types indicated above or other modern GPU adaptable for use in accord with the teachings hereof). Using the highly parallelized pixel processing units native to the GPU, data necessary for histogram computation can be efficiently gathered via texture lookups. However, computing the histograms requires data scattering—i.e., for each pair of input values, the respective bin count of the histogram must be incremented. Since data scattering is not supported directly by typical GPU's, the two-pass approach shown in FIG. 2 and described below is utilized:

1. A two-component (or two-channel) floating point render target is set up with as many pixels as there are samples; see, step 40. The locations x of the samples are stored in a texture residing on the GPU; see, step 42. This texture has the same resolution as the render target. In addition, the images A and B to be aligned are stored in (3D) textures also residing on the GPU; see, step 44.

2. In a first pass, a simple polygon covering the whole render target is drawn; see, step 46. For each pixel in the render target, the location x of corresponding sample point is looked up; see, step 46a. Then the intensities A(x) and B(T(x)) are looked up and written into that pixel of the render target; see, step 46b.

3. In a second pass, the histogram is rendered; see, step 48. To do so, the two-component floating point render target is interpreted as a buffer containing vertex positions. In step 48a, a new render target of size N×N is setup and initialized with 0. For each sample a single vertex is rendered using the coordinates from the vertex buffer. Additive blending is enabled and for each sample the corresponding output pixel is incremented by one. See step 48b.

4. After all samples have been rendered, the N×N render target represents the histogram that was to be computed. The histogram is read back into main memory and mutual information is computed on the CPU according to the equations above. See step 50.

In computing the histogram by the foregoing approach, if the data sets are too large to fit entirely into texture memory, then they are broken down into smaller "bricks", which are processed independently. Then the resulting histograms are combined in a further step. Also if there are more samples than would fit into a single texture, e.g., in steps 42 and 44, then multiple passes are rendered, accumulating into the same histogram render target.

As an alternative to storing the sample locations in a texture in step 42, they can be computed on-the-fly in the vertex or pixel shader, e.g., in step 46a. In case of a regular sampling, this can be more efficient.

In order to convert a render target into vertex data, in step 48, the illustrated embodiment utilizes functionality exposed, for example, in DirectX 9.0 graphics© 2002 Microsoft Corp with the vertex shader version 3.0 and in OpenGL2003 with the ARB_vertex_shader extension, or their equivalents.

Approach 2

This alternative approach does not require the vertex data functionality but instead a ID histogram functionality, as defined in the ARB_IMAGING_EXTENSION, which is part of OpenGL 1.2. However, since not all GPUs necessarily implement this extension in hardware, this approach is not necessarily efficient on all GPUs that support the extension.

Approach 2 can be implemented identically to Approach 1 (described above), with the following differences:

In step 40, a render target of only one channel is set up.

In step 46b, instead of rendering the intensities A(x) and B(T(x)) into a two-channel output, the value A(x)*N+B(T(x)) is rendered into a single channel render target.

In steps 48a-48b, a 1D histogram is computed over the render target. The size of the histogram must be N*N.

In step 50, the resulting render target—a 1D histogram—is the interpreted as a 2D histogram using the following definition:

$$p_{A,B \circ T}(a, b) = p^{1D}_{A,B \circ T}(a * N + b)$$

A further understanding of the foregoing may be attained by reference to the following, the teachings of which are incorporated herein by reference, and the citation of which is not intended as, nor shall it be deemed, an admission that any or all of them is/are prior art: P. A. Viola. Alignment by Maximization of Mutual Information. PhD thesis, Massachusetts Institute of Technology (MIT), Cambridge, Mass., March 1995. http://citeseer.ist.psu.edu/viola95alignment.html; MICROSOFT CORP. 2002. DirectX 9.0 graphics, Dec. Available at http://msdn.microsoft.com/directx; OpenGL2003: OpenGL ARB; OpenGL Extension ARB_vertex_shader, 2003, http://oss.sgi.com/projects/ogl-sample/registry/ARB/vertex_shader.txt.

Described above are methods and apparatus meeting the objects set forth herein. Those skilled in the art will appreciate that the embodiments described above are merely examples of the invention and that other embodiments, incorporating changes thereto, fall within the scope of the invention. Thus, by way of non-limiting example, it will be appreciated that the methods described herein can be used to calculate histograms not only for use in determining mutual information, but also for determining entropy and related expressions. In view of the foregoing, what we claim is:

The invention claimed is:

1. A digital data processing method of determining mutual information of two images by executing software using a central processing unit (CPU), comprising:
computing a histogram as part of a process of registering a first image and a second image, said histogram representing a probability that pixel values in the first image coincide with pixel values in the second image, said computing step being performed on a graphics processing unit (GPU) using a two-pass approach, including:
in a first pass, drawing a polygon covering a first render target comprising pixels each of which has (i) a first channel representing an image intensity of a corresponding pixel from the first image and (ii) a second channel representing an image intensity of a corresponding pixel from the second image, and
in a second pass, rendering a second render target at vertices corresponding to selected values in pixels of the first render target.

2. The method of claim 1, wherein, at completion of the second pass, the second render target represents the histogram.

3. The method of claim 1, wherein there are as many pixels in the first render target as there are samples over which the probability and the histogram are to be computed.

4. The method of claim 1, wherein the first pass includes storing in a texture on the GPU locations of the samples in the first and second images.

5. The method of claim 4, wherein the texture has a same resolution as the first render target.

6. The method of claim 1, wherein the first pass includes storing the first and second images in respective textures on the GPU.

7. The method of claim 1, wherein the first pass includes utilizing the GPU to draw the polygon by the steps of identifying, for each pixel in the first render target, the location of a corresponding sample point in each of the first and second images, and writing to that pixel in the first render target intensities of those sample points.

8. The method of claim 1, wherein the second pass includes the step of interpreting the first render target as a buffer of vertices.

9. The method of claim 8, wherein the second pass includes setting up the second render target with N×N pixels and initializing them with zeros, where N represents a maximum binning value for the histogram.

10. The method of claim 9, wherein the second pass further includes rendering, for each sample point over which the probability and histogram are to be computed, a single vertex in the second render target using coordinates from the buffer of vertices.

11. The method of claim 10, comprising enabling additive blending and incrementing by one a pixel value at each rendered vertex.

12. A digital data processing method of determining mutual information of two images by executing software using a central processing unit (CPU), comprising
computing a histogram representing a probability that pixel values in a first image coincide with pixel values in a transformation of a second image by a two-pass approach that includes:
A. a first pass that includes utilizing the graphics processing unit (GPU) that is coupled to the CPU to draw a polygon covering a two-channel first render target comprising pixels each of which has (i) a first channel representing an image intensity of a corresponding pixel from the first image and (ii) a second channel representing an image intensity of a corresponding pixel from the transformation of the second image,
B. the first pass further including (i) storing in a texture on the GPU locations of the samples in the first image and the transformation of the second image, (ii) storing the first image and the transformation of the second image in respective textures on the GPU, (iii) utilizing the GPU to draw the polygon by the steps of identifying, for each pixel in the two-channel first render target, the location of a corresponding sample point in each of the first and second images, and writing to that pixel in the two-channel first render target intensities of those sample points, C. a second pass that includes utilizing the GPU to render a second render target at vertices corresponding to values in pixels of the two-channel first render target, D. the second pass further including (i) interpreting the two-channel first render target as a buffer of vertices, (ii) setting up the second render target with N×N pixels and initializing them with zeros, where N represents a maximum binning value for the histogram, and (iii) rendering, for each sample point over which the probability and histogram are to be computed, rendering a single vertex in the second render target using coordinates from the buffer of vertices, and E. returning the second render target as representing the histogram.

13. The method of claim 12, wherein the histogram represents a probability that can be expressed as follows:

$$p_{A,B\circ T}(a, b) = \text{card}(\{x \in G \mid A(x) = a \ddot{Y} B(T(x)) = b\}) \frac{1}{\text{card } G}$$

where
A denotes the first image,
a denotes pixel values in the first image,
B(T(x)) denotes the transformation of the second image,
b denotes pixel values in the transformation of the second image,
$p_{A,B\circ T}(a,b)$ denotes the probability that a pixel value a in the first image coincides with a pixel value b in the transformation of the second image,
G denotes a set of locations within the first image and the transformation of the second image over which the probability and the histogram is to be computed,
card denotes a number of elements in the set G,
N is a maximum binning value for the histogram, and
x denotes locations within the set G.

14. The method of claim 13, comprising determining the mutual information H(A,B∘T) as a function of the relation:

$$H(A, B\circ T) = -\hat{A}_{a=0}^{N} \hat{A}_{b=0}^{N} p_{A,B\circ T}(a, b)\log(p_{A,B\circ T}(a, b))$$

where
A denotes the first image,
a denotes pixel values in the first image,
B∘T denotes the transformation of the second image,
b denotes pixel values in the transformation of the second image,
$p_{A,B\circ T}(a,b)$ denotes the probability that a pixel value a in the first image coincides with a pixel value b in the transformation of the second image, and
N is a maximum binning value for the histogram.

15. A digital data processing method of determining mutual information of two images by executing software using a central processing unit (CPU), comprising computing a histogram representing a probability that pixel values in a first image coincide with pixel values in a transformation of a second image by a two-pass approach that includes:

A. a first pass that includes utilizing the graphics processing unit (GPU) that is coupled to the CPU to draw a polygon covering a two-channel first render target comprising pixels each of which has (i) a first channel representing an image intensity of a corresponding pixel from the first image and (ii) a second channel representing an image intensity of a corresponding pixel from the transformation of the second image, B. the first pass further including (i) storing the first image and the transformation of the second image in respective textures on the GPU. (ii) utilizing the GPU to draw the polygon by the steps of computing with any of a pixel shader and a vertex shader of the GPU a location of a sample point in each of the first image and the transformation of the second image corresponding to each pixel in the two-channel first render target, and writing to that pixel in the two-channel first render target intensities of those sample points, C. a second pass that includes utilizing the GPU to render a second render target at vertices corresponding to values in pixels of the two-channel first render target, D. the second pass further including (i) interpreting the two-channel first render target as a buffer of vertices, (ii) setting up the second render target with N×N pixels and initializing them with zeros, where N represents a maximum binning value for the histogram, and (iii) rendering, for each sample point over which the probability and histogram are to be computed, rendering a single vertex in the second render target using coordinates from the buffer of vertices, E. returning the second render target as representing the histogram.

16. In a digital data processing method of determining the mutual information of two images by executing software on a central processing unit (CPU), comprising computing a histogram representing a probability that pixel values in a first image coincide with pixel values in a transformation of a second image by a two-pass approach that includes:

A. a first pass that includes utilizing the graphics processing unit (GPU) that is coupled to the CPU to draw a polygon covering a one-channel render first target, B. the first pass further including (i) storing in a texture on the GPU locations of the samples in the first image and the transformation of the second image, (ii) storing the first image and the transformation of the second image in respective textures on the GPU; (iii) utilizing the GPU to draw the polygon by the steps of identifying, for each pixel in the one-channel first render target, the location of a corresponding sample point in each of the first and second images, and writing to that pixel a value expressed as $A(x)*N+B(T(x))$ where
A(x) denotes a pixel value at sample location x in the first image,
B(T(x)) denotes a pixel value at sample location x in the transformation of the second image,
N is a maximum binning value for the histogram, C. a second pass that includes utilizing the GPU to render a further, one-dimensional second render target representing a histogram of the one-channel first render target,
D. interpreting the one-dimensional second render target as a two-dimensional histogram expressed as follows $$p_{A,B \circ T}(a, b) = p^{1D}_{A,B \circ T}(a * N + b).$$

* * * * *

UNITED STATES PATENT AND TRADEMARK OFFICE
CERTIFICATE OF CORRECTION

PATENT NO. : 7,609,884 B1  Page 1 of 1
APPLICATION NO. : 11/312837
DATED : October 27, 2009
INVENTOR(S) : Stalling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this

Twelfth Day of October, 2010

David J. Kappos
*Director of the United States Patent and Trademark Office*